(12) United States Patent
Matsugashita

(10) Patent No.: US 9,521,144 B2
(45) Date of Patent: Dec. 13, 2016

(54) AUTHORITY DELEGATE SYSTEM, AUTHORIZATION SERVER SYSTEM, CONTROL METHOD, AND PROGRAM

(71) Applicant: CANON KABUSHIKI KAISHA, Tokyo (JP)

(72) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 14/308,502

(22) Filed: Jun. 18, 2014

(65) Prior Publication Data

US 2014/0380429 A1 Dec. 25, 2014

(30) Foreign Application Priority Data

Jun. 21, 2013 (JP) ................. 2013-130857

(51) Int. Cl.
*H04L 29/06* (2006.01)
(52) U.S. Cl.
CPC ....... *H04L 63/0884* (2013.01); *H04L 63/0823* (2013.01)
(58) Field of Classification Search
CPC .. H04L 63/0884; H04L 63/08; H04L 63/0823; H04L 63/0807; H04L 63/102; G06F 21/30
See application file for complete search history.

(56) References Cited

U.S. PATENT DOCUMENTS

| 8,402,508 B2* | 3/2013 | Rouskov et al. ............... 726/2 |
| 2007/0079369 A1* | 4/2007 | Grinstein ................. 726/19 |
| 2009/0254745 A1* | 10/2009 | Ganesan ................. 713/151 |
| 2010/0257578 A1* | 10/2010 | Shukla et al. ............ 726/1 |
| 2013/0086645 A1* | 4/2013 | Srinivasan et al. ............ 726/4 |
| 2014/0007198 A1* | 1/2014 | Durbha et al. ............ 726/4 |
| 2014/0013396 A1* | 1/2014 | Field-Eliot et al. ............ 726/4 |
| 2014/0189797 A1* | 7/2014 | Nori et al. ............ 726/4 |

(Continued)

OTHER PUBLICATIONS

Jones, M. and D. Hardt, "The OAuth 2.0 Authorization Framework: Bearer Token Usage", Oct. 2012, Internet Engineering Task Force, RFC 6750.*

(Continued)

*Primary Examiner* — Eleni Shiferaw
*Assistant Examiner* — Nelson Giddins
(74) *Attorney, Agent, or Firm* — Canon USA, Inc. IP Division

(57) ABSTRACT

An authority delegate system, including a server system which provides a service to a device having an application, and an authorization server system which performs authorization processing to delegate user authority in the service to a usage source of the service, includes a management unit, and a providing unit. The management unit identifies authority of the application, in accordance with having received a request to register the application as the usage source, and manages the identified authority, and an identifier of the application, in an associated manner. The providing unit provides the service, in a case where an authorization operation has been performed to permit delegating of the user authority to the application transmitting a request to use the service, and an authority which the application uses is included in authorities associated with the identifier of the application.

13 Claims, 15 Drawing Sheets

(56) References Cited

U.S. PATENT DOCUMENTS

2014/0245013 A1\* 8/2014 Kim ........................ H04L 67/34
　　　　　　　　　　　　　　　　　　　　　　713/171

OTHER PUBLICATIONS

D. Hardt, "The OAuth 2.0 Authorization Framework", Oct. 2012, Internet Engineering Task Force, RFC 6749.\*
D. Hardt, Ed., The OAuth 2.0 Authorization Framework, Internet Engineering Task Force (IETF), Oct. 2012, pp. 1-18.

\* cited by examiner

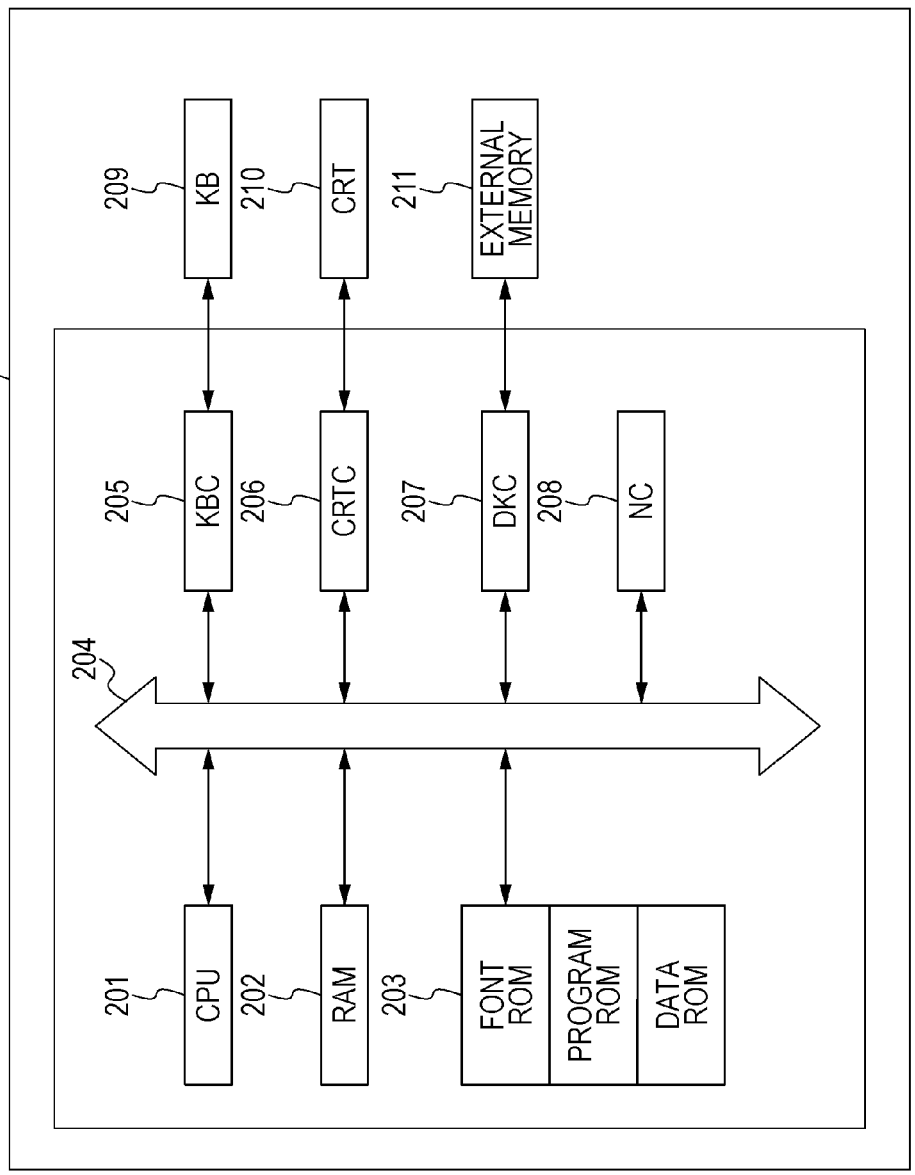

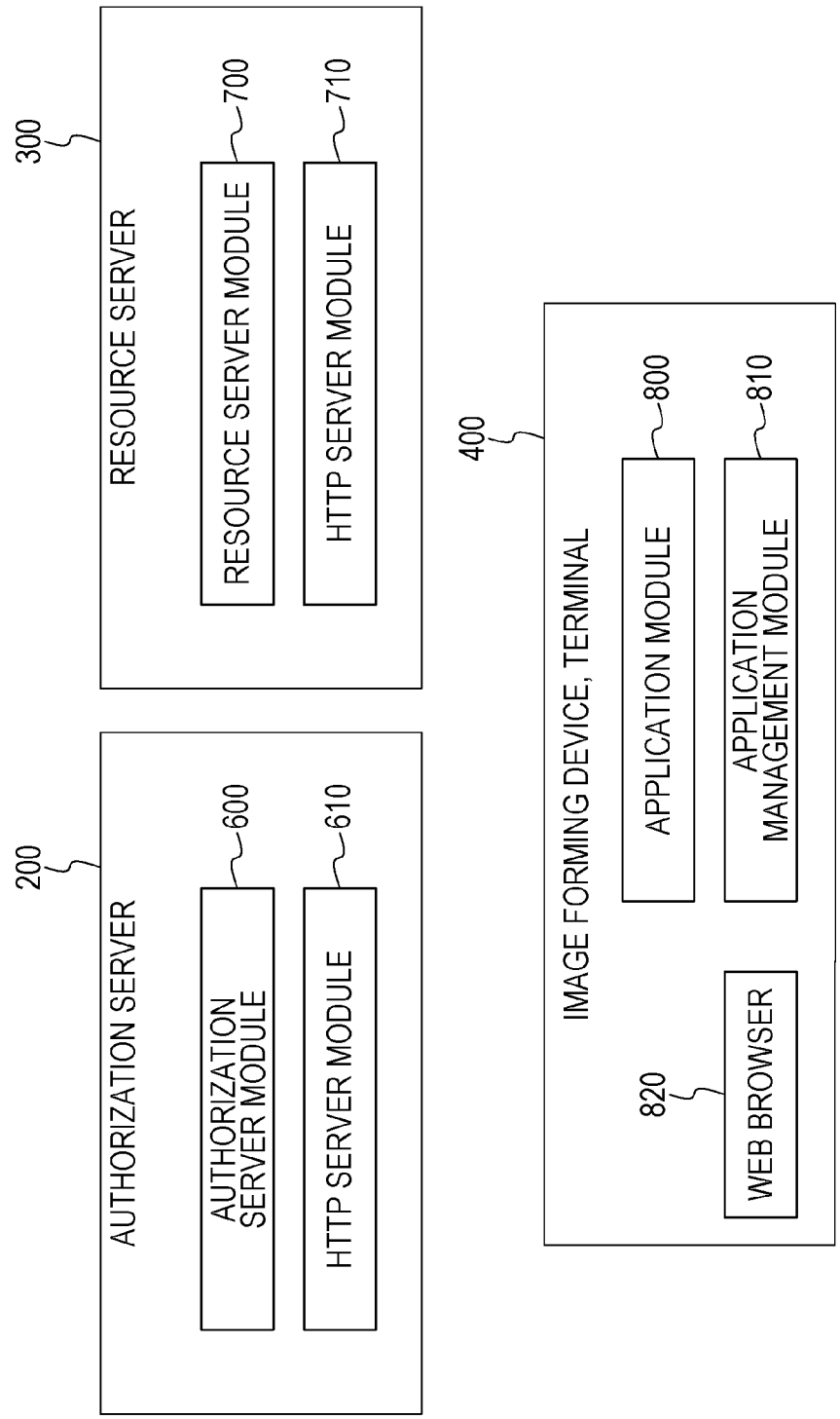

FIG. 4A

CERTIFICATE MANAGEMENT TABLE 1200

| SERIAL NO. 1201 | ISSUER 1202 | SUBJECT 1203 | START AT 1204 | END AT 1205 | TENANT MASTER DN 1206 |
|---|---|---|---|---|---|
| 00abcdef000000000000001 | AA Root CA 01 | Client 00001 Master | 05/30/2013 | 05/30/2015 | CN=master00001,OU=10001AA |
| 00abcdef000000000000002 | AA Root CA 01 | Client 00002 Master | 05/30/2013 | 05/30/2015 | CN=master00003,OU=10002AA |
| 00abcdef000000000000003 | AA Root CA 01 | Client 00003 Master | 05/30/2013 | 05/30/2036 | CN=master00003,OU=10003AA |

FIG. 4B

CLIENT MANAGEMENT TABLE 1300

| CLIENT ID 1301 | SECRET 1302 | TENANT ID 1303 | TYPE 1304 | DN 1305 | CLIENT NAME 1306 | REDIAL URL 1307 |
|---|---|---|---|---|---|---|
| master00001@10001AA | ************ | 10001AA | MASTER | CN=master00001,OU=10001AA | | |
| master00003@10002AA | ************ | 10002AA | MASTER | CN=master00002,OU=10002AA | | |
| master00003@10003AA | ************ | 10003AA | MASTER | CN=master00003,OU=10003AA | | |
| 01d7e3139d4e4e6282o3e179e14o1de2@10001AA | ************ | 10001AA | GENERAL | CN=01d7e3139d4e4e6282o3e179e14o1de2,OU=10001AA | IN-COMPANY APPLICATION | https://intranet/redirect |
| 05375a3a39c3e4e64213f17eb1331a31@10002AA | ************ | 10002AA | GENERAL | CN=05375a3a39c3e4e64213f17eb1331a31,OU=10002AA | PRINTING APPLICATION | https://paidapplication/redirect |
| 543ae4f3998be4eb7ed92ea99e43f2ae@10003AA | ************ | 10003AA | GENERAL | CN=543ae4f3998be4eb7ed92ea99e43f2ae,OU=10003AA | PRINTING APPLICATION | https://freeapplication/redirect |
| | | | | | | |

| DEFAULT AUTHORITY MANAGEMENT TABLE ||
|---|---|
| 1401 | 1402 |
| TENANT ID | DEFAULT AUTHORITY ID |
| 10001AA | USER PROVISIONING |
| 10002AA | PAY DATA CONVERSION |
|  |  |

| CLIENT AUTHORITY TABLE ||
|---|---|
| 1501 | 1502 |
| CLIENT ID | AUTHORITY ID |
| 01d7e3139d4e4e628203e179e1401de2@10001AA | USER PROVISIONING |
| 053753a39d3e4e648213f17eb1331a31@10002AA | PAY DATA CONVERSION |
|  |  |

FIG. 5A

SCOPE TABLE (1600)

| SCOPE ID (1601) | TYPE (1602) | DESCRIPTION (1603) | AUTHORITY ID (1604) |
|---|---|---|---|
| owner.UserAdmin | OWNER SCOPE | USER INFORMATION | TENANT MANAGER |
| client.UserProvisioning | CLIENT SCOPE | – | USER PROVISIONING |
| client.PaidService | CLIENT SCOPE | – | PAY DATA CONVERSION |
| client.FreeService | CLIENT SCOPE | – | – |
|  |  |  |  |

FIG. 5B

USER MANAGEMENT TABLE (1700)

| USER ID (1701) | PASSWORD (1702) | TENANT ID (1703) |
|---|---|---|
| user001@user.com | ********** | 1001AA |
|  |  |  |

FIG. 5C

USER AUTHORITY TABLE (1800)

| USER ID (1801) | AUTHORITY ID (1802) |
|---|---|
| user001@user.com | TENANT MANAGER |
|  |  |

FIG. 5D

AUTHORIZATION TOKEN MANAGEMENT TABLE 1900

| AUTHORIZATION TOKEN ID 1901 | TOKEN TYPE 1902 | EXPIRATION DATE 1903 | SCOPE ID 1904 | CLIENT TOKEN ID 1905 | OWNER ID 1906 |
|---|---|---|---|---|---|
| AC_0000001 | AUTHORIZATION CODE | 05/30 11:00.00/2013 | owner.UserAdmin client.UserProvisioning | 01d7e3139d4e4e628203e179e14001de2@10001AA | user001@user.com |
| AT_0000002 | AUTHORIZATION TOKEN | 05/30 24:00.00/2013 | owner.UserAdmin client.UserProvisioning | 01d7e3139d4e4e628203e179e14001de2@10001AA | user001@user.com |
| AT_0000003 | AUTHORIZATION TOKEN | 05/30 24:00.00/2013 | client.PaidService | 053753a39d3e4e64821317eb1331a31@10002AA | 053753a39d3e4e64821317eb1331a31@10002AA |
| AT_0000004 | AUTHORIZATION TOKEN | 05/30 24:00.00/2013 | client.FreeService | 543ae4f3998be4eb7ed92ea99e43f2ae@10003AA | 543ae4f3998be4eb7ed92ea99e43f2ae@10003AA |
| | | | | | |

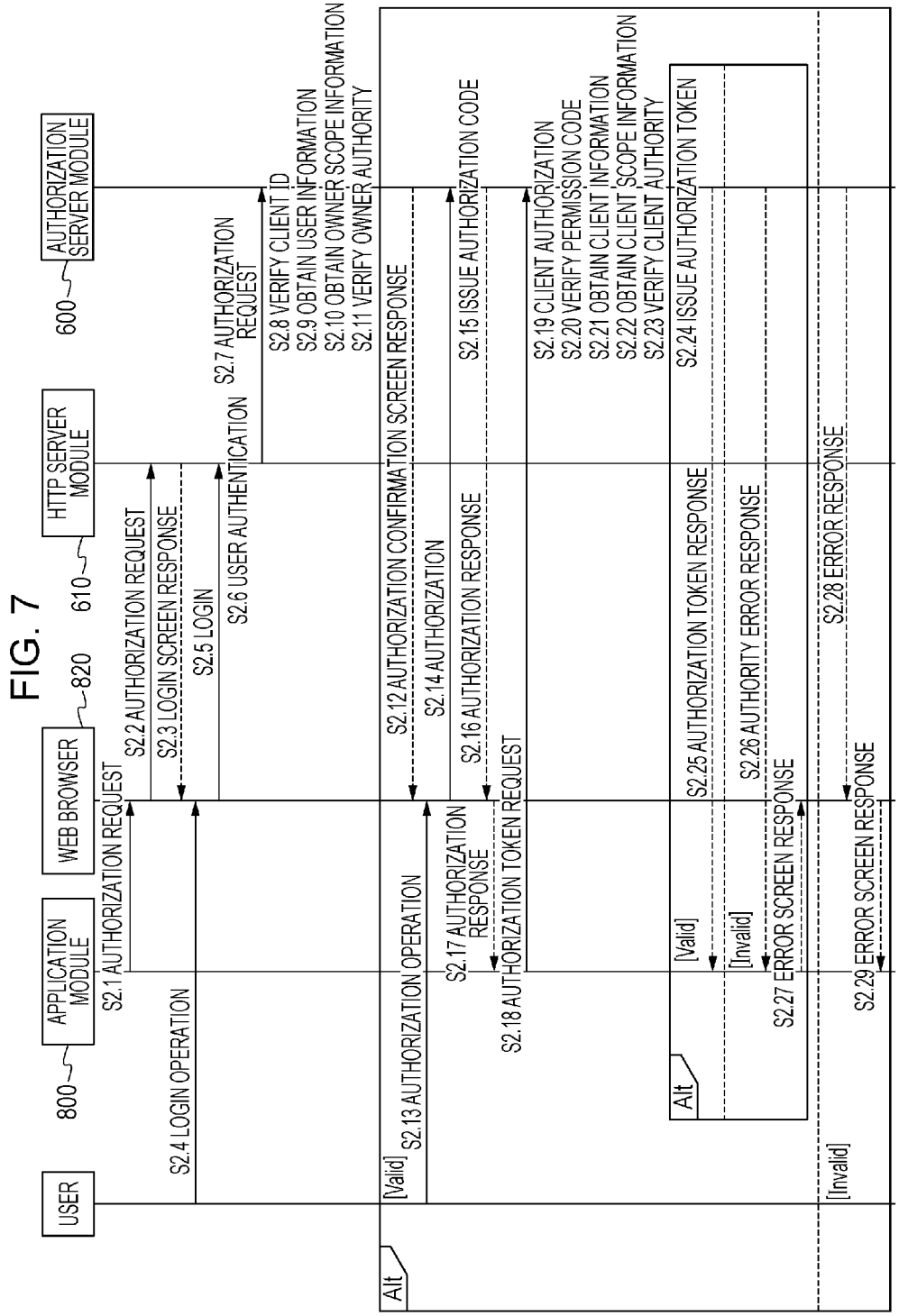

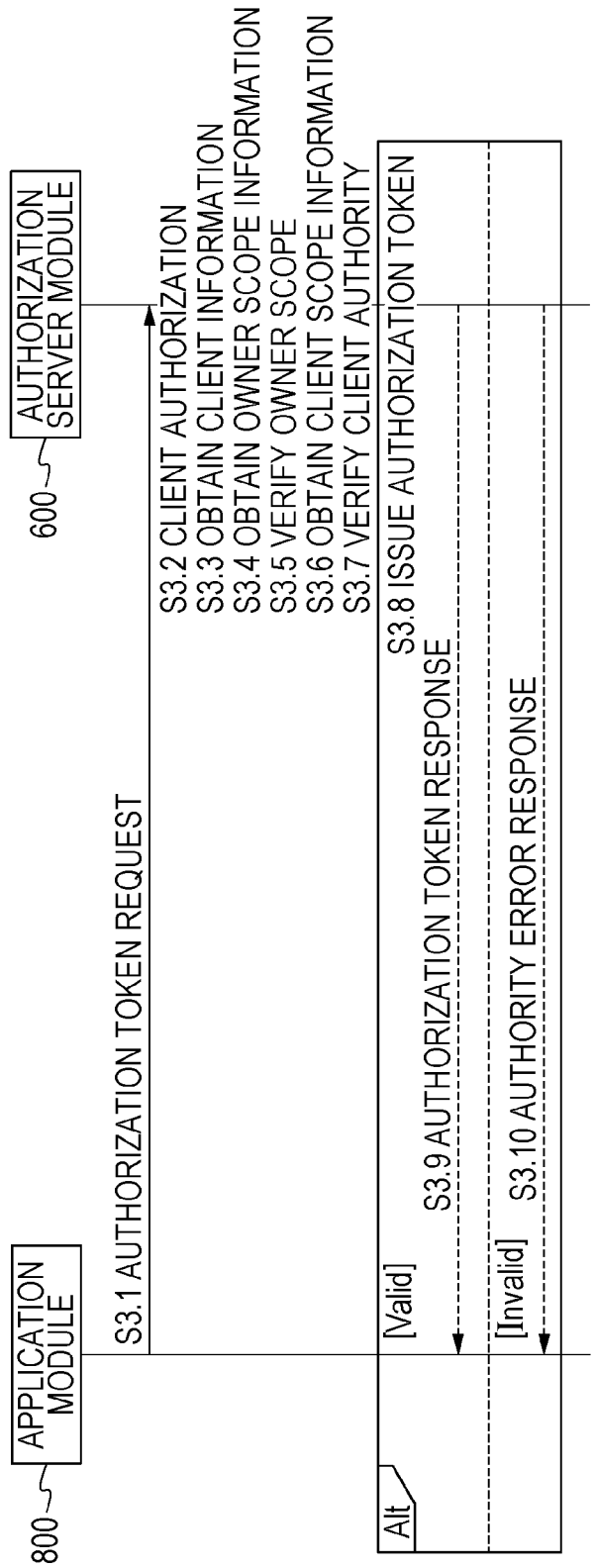

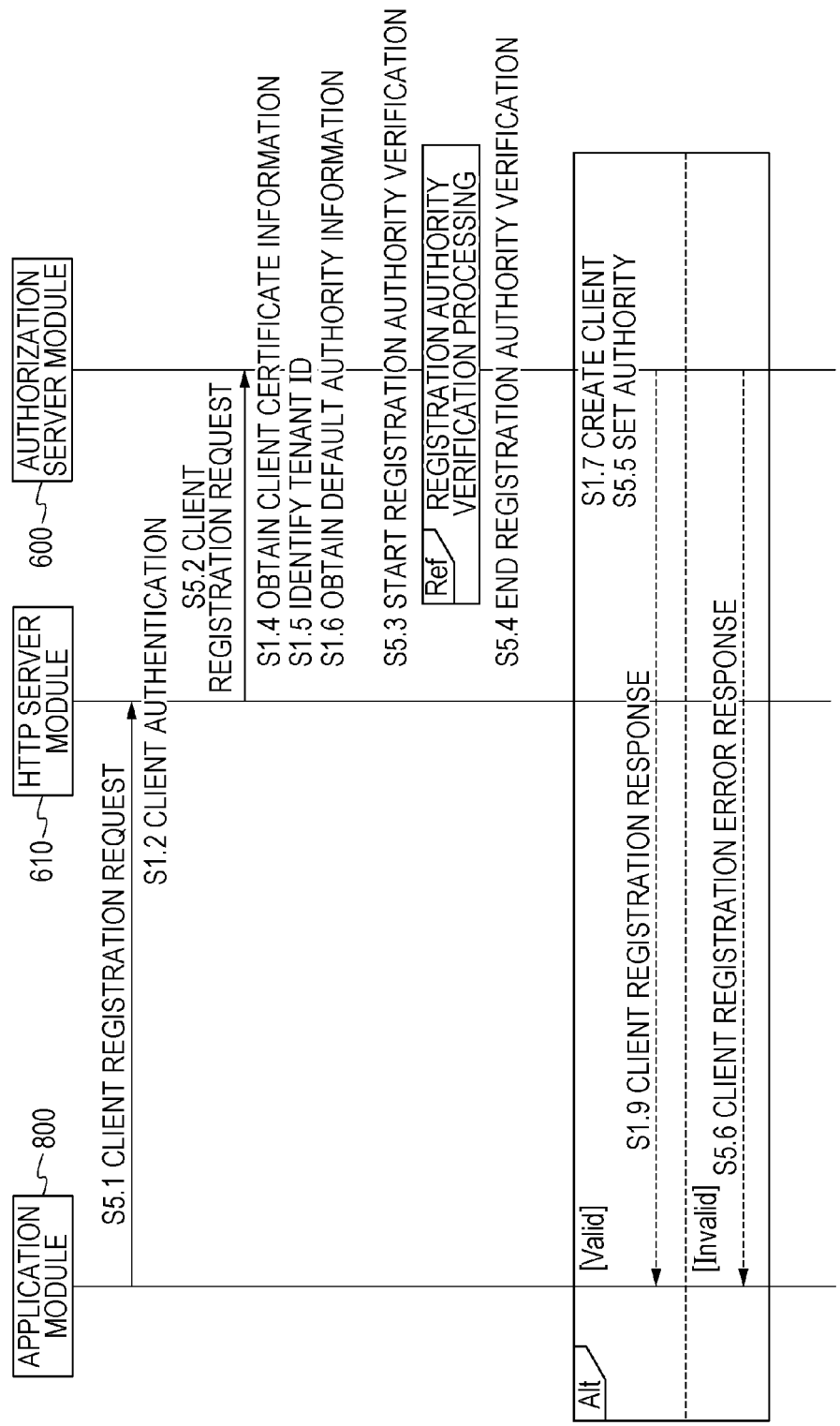

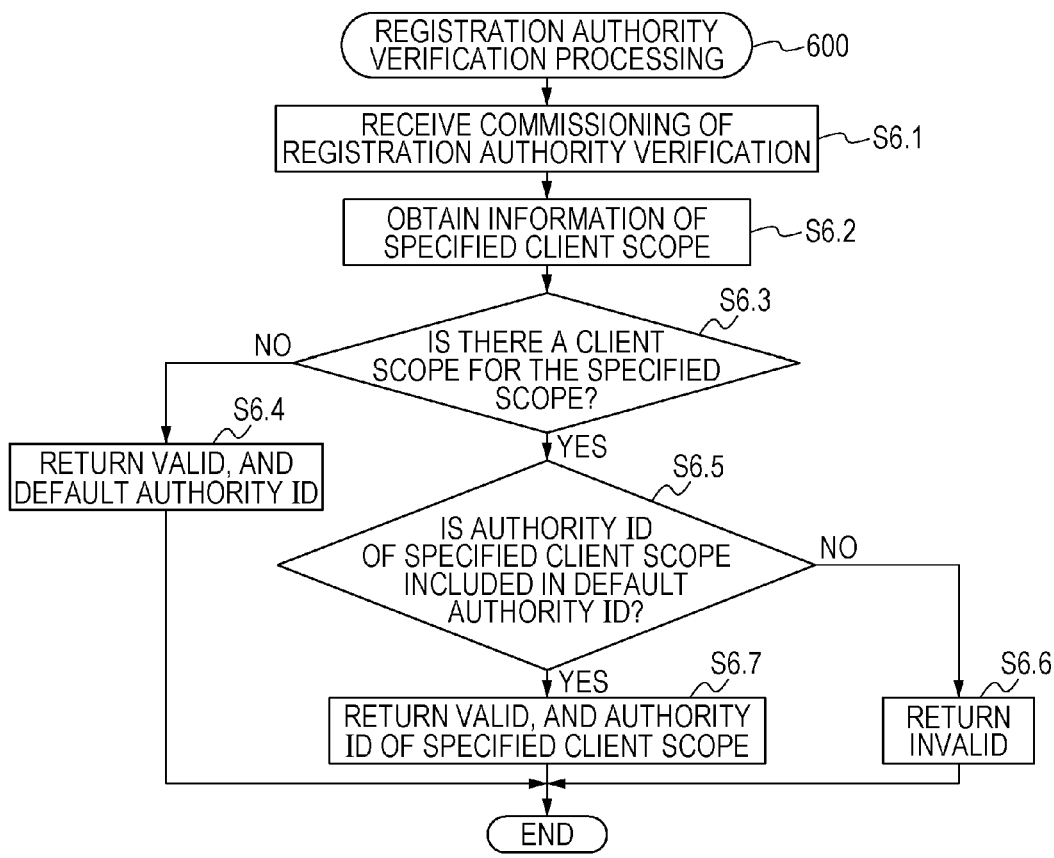

AUTHORITY DELEGATE SYSTEM, AUTHORIZATION SERVER SYSTEM, CONTROL METHOD, AND PROGRAM

BACKGROUND OF THE INVENTION

Field of the Invention

The present invention relates to an authority delegate system which performs client registration, an authorization server system, a control method, and a program.

Description of the Related Art

There is a standard protocol to realize coordination of authorization, called OAuth 2.0 ("The OAuth 2.0 Authorization Framework", [online] D. Hardt, May 2013 <URL http://tools.ietf.org/html/rfc6749>). OAuth 2.0 enables an application B which has been authorized by a user and which is installed in a terminal operated by the user, to access data of the user which a service A on the Internet manages, for example. OAuth 2.0 refers to a subject to which authority is delegated, like the application B, as an "OAuth client", or simply "client". The service A is supposed to obtain explicit user authorization regarding access by the application B, upon having clarified the range of access by the application B. The action of the user giving explicit authorization is called "authorization operation".

Once the user has performed an authorization operation, the application B receives a token certifying that access has been permitted by service A (hereinafter referred to as "authorization token"). Access thereafter can be realized using this authorization token. The application B which uses the authorization token can access the service A under the authority of the user which has performed the authorization operation, without prompting the user for input of authorization information. Accordingly, the application B which has been authorized by the user and acquired the authorization token is bound responsible to manage the authorization token in a secure and proper manner.

OAuth 2.0 has to authenticate the application B and grant predefined authority before the authorization operation is performed, in order to prevent spoofing of the application B. In order to authenticate the application B, the service A has to issue and manage authentication information of the application B beforehand. This authentication information is a client ID and secret. Further, this authentication information has to be set in the application B. An online application registration protocol is being studied as a specification pertaining to OAuth 2.0, called Dynamic Client Registration Protocol. According to this Dynamic Client Registration Protocol, a requestor for each client registration is dynamically subjected to client registration by transmitting metadata to an endpoint for client registration, and thus authentication information can be obtained. The endpoint is an authorization service provided to a server side implementing OAuth 2.0. This mechanism enables the trouble of performing individual settings to be avoided, since each application subjectively obtains authentication information, rather than authentication information being set to each of a great number of applications which have been distributed. When confirming an authorization token, not only is the authority delegated from the user confirmed, but also the authority of the application B itself is confirmed, and whether to permit or deny usage of the user is thus decided.

SUMMARY OF THE INVENTION

Registration protocols of application involving authority delegate processing, such as OAuth 2.0, grant uniformly identical authority to all applications being registered. For example, in the event that an unnecessary authority is granted to a certain application, and user authority is grated to that application, there is the concern that the certain application may use a service which was not expected to be used.

It has been found a benefit to provide an authorization server which grants suitable authority in accordance with applications being registered by an application registration protocol in authority delegate processing.

According to an aspect of the present invention, an authority delegate system, including a server system which provides a service to a device having an application, and an authorization server system which performs authorization processing to delegate user authority in the service to a usage source of the service, includes a management unit configured to identify authority of the application, in accordance with having received a request to register the application as the usage source, and manage the identified authority, and an identifier of the application, in an associated manner, and a providing unit configured to provide the service, in a case where an authorization operation has been performed to permit delegating of the user authority to the application transmitting a request to use the service, and an authority which the application uses is included in authorities associated with the identifier of the application.

Further features of the present invention will become apparent from the following description of exemplary embodiments with reference to the attached drawings.

According to the present invention, suitable authority can be granted in accordance with applications being registered by an application registration protocol in authority delegate processing.

BRIEF DESCRIPTION OF THE DRAWINGS

FIG. 2 is a block diagram of hardware of components.

FIG. 3 is a block diagram of software modules of components.

FIGS. 4A through 4D illustrate client-related table structures managed at an authorization server.

FIGS. 5A through 5D illustrate token-related table structures managed at an authorization server.

FIG. 7 illustrating an authorization token issuing sequence in a case of Authorization Code Grant.

FIG. 9 illustrates an authorization token issuing sequence in a case of Client Credentials Grant.

FIG. 11 illustrates a registration sequence according to a second embodiment.

FIG. 12 illustrates a registration authority verification process flow.

DESCRIPTION OF THE EMBODIMENTS

Figure 1:
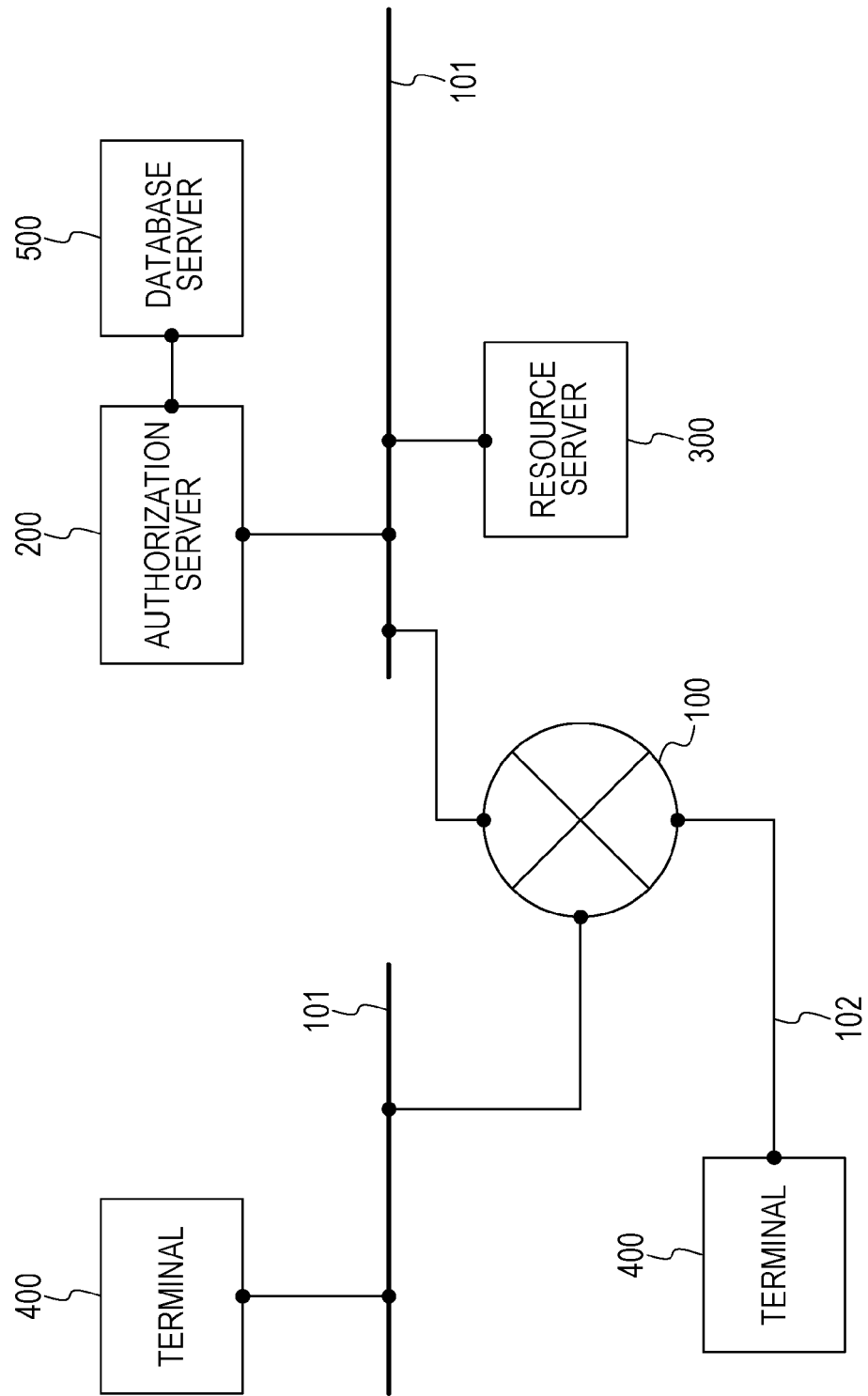
FIG. 1 is a block diagram of a system according to a first embodiment.

Terminology used in the present invention, an outline of service which the system in the embodiments of the present invention have, and applications cooperating with the service, will be described. The service is a function provided to a server connected via a network, and can supplement functions not provided to accessing terminals. The phrase "provide service" means to allow an accessing source and/or a user to use functions provided to the server. In an example, service is provided in a case where an authority used by an application is within authority associated with an identifier of the application.

Services include pay services for which the user is billed for using, and free services with no billing. A pay service basically can be used by a user entering into contract therewith, and the service is bound responsible to provide the service in accordance with the contents of the contract in a stable manner. For example, there is a system to ensure the quality of service, called Service Level Agreement (SLA). SLA defines the minimum speed, upper limit of down time, and so forth, of the service being provided. The user pays usage fees as the price of the service quality defined in the SLA. The SLA also defines actions to be taken in a caser where the defined quality is not delivered, including penalties for the service provider, and guaranteeing the user such as discounting usage fees, for example. Accordingly, it is very important for pay services to deliver the quality defined in the SLA. Free services have interface specifications disclosed for receiving services, and third parties have opportunities to develop applications. No terms like those of the SLA exist for free services.

There are at least three services which the system in the embodiments of the present invention provides. One is a pay service, in which a user provisioning service for provisioning user data registered on the Internet is installed in a server on the Internet. A second is a pay service, in which a pay data conversion service to convert document data which a terminal holds into printable data, is installed in a server on the Internet. The third is a free service, and in the same way as with the second service, in that a free data conversion service to convert document data which a terminal holds into printable data, is installed in a server on the Internet. Each of these servers will be referred to as a "resource server". These are servers configuring the system which the present invention assumes. While description will be made regarding an arrangement where one service is provided to each resource server, two or more different services may be provided to one resource server.

Further, there are both pay applications and free applications for applications which are provided to terminals such as smartphones and tablets and which are coordinated with the service. A pay application has to guarantee quality to the user, in the same way as with the pay service. Moreover, there is the need to create the application coordinating with the service to a high level of quality in order to deliver on the SLA for the pay service, which is costly. In other words, the service providers pay a great deal of money create applications to achieve the SLA for the pay service. The pay applications are provided to user to have paid, while the free applications are distributed free of cost.

In the case of such a system, there are the following specific problems. In a case where a conventional application registration protocol is provided to the user in the authority delegate processing, to avoid the trouble of distributing applications, it becomes difficult to prevent a free application created by a third party from using the pay service. If the user authority for a pay service is delegated to a free application, the free application has the authority to use the service, no different from the pay application, which is unpreventable. As a result, the pay service provider finds it difficult to achieve the SLA, and consequently the pay service business may collapse. Moreover, the application which the provider has paid a great amount of money to develop in order to achieve the SLA is not used, and recovering this investment becomes difficult.

First Embodiment

A first embodiment is directed to detailed description of a system to solve the above-described problem. The authority delegate system according to the present embodiment is realized on a network configuration such as illustrated in FIG. 1. Reference numeral 100 denotes a wide area network (hereinafter "WAN 100"). A World Wide Web (WWW) system is configured in the present invention. Reference numeral 101 denotes a local area network (LAN 101) connecting the components, and 102 denotes a public network connecting the components.

Reference numeral 200 denotes an authorization server to realize OAuth 2.0, and includes an authorization server module which performs authorization processing to issue tokens. Reference numeral 300 denotes a resource server, and includes resource server modules such as a user provisioning service, pay data conversion service, free data conversion service, and so forth. Note that the number of resource server modules installed in one resource server may be one, or may be multiple. Reference numeral 400 denotes a device such as a smartphone, portable terminal, image formation apparatus, or the like. One or more application modules are installed therein. The user uses the application modules to communicate with the resource server. Reference numeral 500 denotes a database server, which is connected to the authorization server 200 via the LAN 101, and stores data which the authentication server module uses.

The authorization server 200, resource server 300, and terminal 400 are each connected via the WAN 100 and LAN 101. The authorization server 200, resource server 300, and terminal 400 may each be configured on separate LANs, or may be configured on the same LAN. The authorization server 200, resource server 300, and database server 500 may be configured on the same server. Each server may be configured of multiple servers, and there is no restriction on the number of servers. A server configured including one or multiple servers is called a "server system", and the term "authorization server system" means one or multiple authorization servers.

The authority delegate system according to the present embodiment is realized on a system including servers configured such as illustrated in FIG. 2, and terminals. FIG. 2 illustrates the hardware configuration of the authorization server 200, resource server 300, terminal 400, and database server 500. The hardware block diagram illustrated in FIG. 2 is equivalent to a hardware block diagram of a common information processing apparatus, so common information processing apparatus hardware configurations can be applied to the servers and terminals of the present embodiment.

In FIG. 2, a CPU 201 executes programs, such as an operating system (OS) and applications and the like, stored in program read only memory (ROM) of ROM 203, or external memory 211 such as a hard disk (HD) and loaded to random access memory (RAM) 202, thereby controlling the blocks connected to a system bus 204. The later-described sequences can be realized by executing these programs. The RAM 202 functions as main memory, work area, and so forth for the CPU 201. A keyboard controller (KBC) 205 controls key input from a keyboard 209 or a pointing device which is omitted from illustration. A cathode ray tube (CRT) controller (CRTC) 206 controls display on a CRT display 210. A disk controller (DKC) 207 controls data access of external memory 211 such as the HD storing various types of data. A network controller (NC) performs communication control processing with other devices connected over the WAN 100, LAN 101, or public circuit 102. Note that in the following description, unless specifically stated otherwise, the hardware subject is the CPU 201, and the software subject is application programs installed in the external memory 211.

FIG. 3 is a diagram illustrating the modular configuration of the authorization server 200, resource server 300, and terminal 400 according to the present embodiment. Note that the authorization server 200, resource server 300, and terminal 400 are the same as illustrated in FIG. 2. The authorization server 200 includes an authorization server module 600 and an HTTP server module 610. The HTTP server module 610 is a module for performing HTTP communication with terminals 400 connecting thereto via the WAN 100. The HTTP server module 610 is configured so as to be capable of communication by secure socket layer (SSL)/transport layer security (TLS), and has a function of saving certificates (not illustrated). The present embodiment is configured such that endpoints, which accept later-described client registration requests, request authentication by X.509 format certificate of the requestor. Next, the authorization server module 600 receives a request from a terminal 400 via the HTTP server module 610, processes the request and responds. In the present embodiment, in the event that the HTTP server module 610 accepts a client registration request and succeeds in authenticating the requestor, the HTTP server module 610 notifies the authorization server module 600 of the certificate received from the client.

The resource server 300 illustrated in FIG. 3 includes a resource server module 700 and an HTTP server module 710. The HTTP server module 710 has the same functions as the HTTP server module 610. The resource server module 700 receives requests from terminals 400 via the HTTP server module 710, processes the requests, and responds.

The terminal 400 in FIG. 3 includes an application managing module 810, a Web browser 820, and one or more application modules 800. The application managing module 810 manages the life cycle of application modules 800 to be managed which are running on the terminal 400. "Life cycle" means the state of the application, including installation, startup, quitting, and uninstalling. An example of the application managing module 810 is Open Services Gateway initiative (OSGi, a registered trademark) stipulated by the OSGi alliance.

The application managing module 810 is an application which runs in an application execution environment which the terminal 400 provides. The life cycle of applications is managed by the application managing module 810. The application module 800 may be initially provided to the terminal 400, or may be installed through the application managing module 810 later. The Web browser 820 is a user agent which is provided to the terminal 400 using the WWW. The application module 800 also has an X.509 certificate and the secret key thereof to certify itself. Thus, the HTTP server module 610 can certify that a request from the application module 800 in communication therewith is a request from an application module, by using the X.509 certificate and the secret key at the time of establishing communication.

FIGS. 4A through 4D are data tables stored in external memory of the database server 500. The data tables are configured so as to be communicated by the authorization server 200 over the LAN 101. These data tables may be configured in external memory of the authorization server 200 instead.

FIG. 4A illustrates a certificate management table 1200. X.509 format certificates are used in the present embodiment. The certificate management table 1200 includes a certificate serial No. 1201, certificate issuer 1202, a subject 1203, a start date 1204, an end data 1205, and a distinguished name (DN) of a later-described tenant master user that is correlated. FIG. 4B illustrates a client management table 1300. The client management table 1300 includes a client ID 1301, client secret 1302, tenant ID 1303, type 1304, DN 1305, client name 1306, and redirect URL 1307. The authorization server 200 has a function of verifying the set of the information in the client ID 1301 and client secret 1302, and generating authentication information if correct, thereby authenticating clients. The client name 1306 and redirect URL 1307 are values used in a later-described sequence. The type 1304 stores data to identify whether or not the client of this record is the master user of a tenant.

FIG. 4C illustrates a default authority management table 1400. The default authority management table 1400 includes a tenant ID 1401 and default authority ID 1402. The tenant ID 1401 and tenant ID 1303 of the client management table 1300 are configured so as to be mutually referenced. FIG. 4D illustrates a client authority table 1500. The client authority table 1500 includes a client ID 1501 and authority ID 1502. The client ID 1501 and the client ID 1301 of the client management table 1300 are configured so as to be mutually referenced. The authority ID 1502 stores the authority ID set in the default authority ID 1402 of the default authority management table 1400. Registration of the authority ID to the authority ID 1502 will be described later. The information illustrated in FIG. 4D is set by authority associated with certificates being identified using FIGS. 4A through 4C, based on the certificate received from the client. That is to say, the authority differs depending on the certificate which the client transmits. Note that the IDs in the present embodiment are one form of identifiers, and that other forms may be used. The term "client ID", for example, means information by which a client can be uniquely identified.

FIGS. 5A through 5D are data tables stored in external memory of the database server 500 configured so as to be communicable with the authorization server 200 via the LAN 101. These data tables may be configured in the external memory of the authorization server 200 instead. FIG. 5A illustrates a scope table 1600. The term "scope" here refers to an accessible range of resources which can be referenced by an issued authorization token, which constitutes authorization information in the OAuth 2.0 authority delegate protocol. The format of expressing the authorization information does not have to be an authorization token (string of alphanumeric characters). The scope table 1600 includes a scope ID 1601, scope type 1602, description 1603 of the scope to be used in a later-described screen example, and authority ID 1604. Two types of scopes are defined here as the scope type 1602, owner scope and client scope. An owner scope indicates a resource access range of the authority delegate source (resource owner) in the later-described OAuth 2.0 authority delegate flow. A client scope indicates a resource access range of the authority delegate destination (client) in the later-described OAuth 2.0 authority delegate flow. While the increments of resource access range will be described as being in increments of services in the first embodiment, functions within the service may be further broken down, or conversely, several services may be grouped together as a service group. The resource access range which can be referenced by an authorization token will be referred to as "authority". Applications or services can use functions such as authority delegate source services or service groups by holding a certain authority.

The term "resource owner" as used here differs depending on the OAuth 2.0 flow. More specifically, in a case of an authorization token acquisition flow by Authorization Code Grant, the resource owner is the user. In a case of an authorization token acquisition flow by Client Credentials Grant, the resource owner is the client itself. The authority ID 1604 in the scope table 1600 indicates the authority necessary to access the scope which that scope ID indicates, with which 0 or more authority IDs can be associated. In a case where multiple authority IDs are associated therewith, the resource indicated by the scope can be accessed by having at least one authority of the multiple authority IDs. If zero authority IDs are associated, i.e., if not even one authority ID is associated therewith, this means that anyone can access the resource as long as a subject authenticated regarding this scope.

FIG. 5B illustrates a user management table 1700. The user management table 1700 includes a user ID 1701, password 1702, and tenant ID 1703. The authorization server 200 has a function of verifying the set of the information in the user ID 1701 and password 1702, and generating authentication information if correct, thereby authenticating users. FIG. 5C is a user authority table 1800. The user authority table 1800 includes a user ID 1801 and authority ID 1802. The user ID 1801 and the user ID 1701 of the user management table 1700 are configured so as to be mutually referenced. While the user authority table 1800 and client authority table 1500 are described as separate tables in the present embodiment, these may be managed as a single table in the table column configuration. FIG. 5D illustrates an authorization token management table 1900. The authorization token management table 1900 includes an authorization token ID 1901, token type 1902, expiration date 1903, scope ID 1904, client ID 1905, and owner ID 1906. Details of processing regarding the authorization token management table 1900 will be described later.

A sequence according to the present embodiment, relating to client registration through resource acquisition at the application module 800, will be described with reference to FIG. 6. This sequence illustrates a flow of a user of a terminal 400 using an application module 800 which is not registered at the authorization server module 600. An arrangement may be made wherein, for example, client registration at the application module 800 of the terminal 400 only needs to be performed once, and thereafter can be performed from an authorization token acquisition sequence.

First, description will be made regarding the client registration sequence at the application module 800, with reference to FIG. 6. In S1.1, the application module 800 of the terminal 400 makes a client registration request to the HTTP server module 610 of the authorization server 200, to register the application module 800 of the usage source of a resource server module 330. The resource server module 330 is not restricted to one and may be multiple, as described above. Description will be made in the present embodiment in which the trigger for the client registration request of the application module 800 is the timing at which the user first installs the application module 800 in the terminal 400 and starts it up. Other conceivable triggers might include the timing of the user selecting a function of the application module 800, causing a resource request to the resource server 300. Another is where the application module 800 has an explicit start operation, and the user has performed this operation at the terminal 400. Note that a client registration request includes the client name, and a redirect URL to use Authorization Code Grant. Other information which may be included are a text string to describe the client, a URL of a site which is described, and other like attached information.

The HTTP server module 610 which has received the client registration request from the application module 800 starts SSL/TSL communication negotiation. At this time, the application module 800 is requested to present a certificate, since settings are configured such that client authentication is to be requested for a client registration request. In S1.2, the HTTP server module 610 uses a certificate set in a certificate store omitted from illustration, to verify the acquired certificate, and authenticate the application module 800 as the requestor for client registration. While authentication of the requestor for the client registration request is described here as being performed by certificate through SSL/TLS in the present embodiment, other methods using IDs and passwords may be used, such as Basic authentication and Digest authentication. An arrangement may be made where a mechanism to issue an authorization token to an authenticated subject for client registration, and accept client registration by verifying the authorization token, having passed through a mechanism to authenticate these subjects. In a case where authentication fails, the HTTP server module 610 returns an error response to the application module 800.

In S1.3, after having authenticated the application module 800, the HTTP server module 610 notifies the authorization server module 600 of the client registration request received from the application module 800. The HTTP server module 610 also notifies the authorization server module 600 of information to identify the authenticated application module 800 at this time. More specifically, the HTTP server module 610 notifies the authorization server module 600 of the information of the acquired certificate. In S1.4, the authorization server module 600 obtains the information of the certificate notified thereto by the HTTP server module 610. In the following S1.5, the authorization server module 600 identifies the information in the certificate management table 1200 using the serial No., issuer, and subject in the acquired certificate as a key, and acquires information of the tenant master DN 1206. The start date 1204 and end date 1205 may also be used as a valid period for verification. In a case where there is no record in the certificate management table 1200, or verification of the valid period fails, the authorization server module 600 returns an error response to the application module 800 via the HTTP server module 610.

Next, in S1.6 the authorization server module 600 acquires the tenant ID 1303 from the client management table 1300 using the acquired tenant master DN 1206 as a key. The authorization server module 600 then acquires the default authority ID 1402 from the default authority management table 1400, using the acquired tenant ID 1303 as a key. There may be cases where multiple default authority IDs 1402 are acquired. In a case where there is none registered in the default authority management table 1400, later-described registration to the client authority table 1500 is not performed. Accordingly, authority associated with the authentication information which the application module 800 that is the client transmits, is granted to the application module 800.

In S1.7, the authorization server module 600 newly registers the client in the client management table 1300, based on the acquired information. More specifically, the authorization server module 600 issues a client ID and secret, creates a DN, and stores these in the client ID 1301, client secret 1302, and DN 1305. The authorization server module 600 also stores the acquired client name, redirect URL, and tenant ID identified from the tenant master DN 1206, in the client name 1306, redirect URL 1307, and tenant ID 1303. The type 1304 is set to general at this time. In S1.8 the authorization server module 600 stores the issued and registered client ID and the default authority ID acquired form the default authority management table 1400 in the client authority table 1500. If multiple default authority IDs have been acquired, multiple records will be stored.

After this registration has been completed, in S1.9 the authorization server module 600 returns the issued client ID and secret to the application module 800 via the HTTP server module 610, thus ending the flow of client registration. This sequence enables online registration of clients to be performed such that the application module 800 is identified, and appropriate authority is granted.

Next, authorization token acquisition through usage of the authorization token to acquire a resource at the application module 800 will be described with reference to FIG. 6. Note that in FIG. 6, "Ref" indicates a reference, meaning that this will be described with reference to another drawing. "Alt" indicates a branch, meaning that this is a branch according to results upstream in the sequence.

In S1.10, the application module 800 starts authorization token acquisition. The trigger for starting the authorization token acquisition may be the timing at which the user starts the application module 800 at the terminal 400. Another conceivable trigger is where the application module 800 has an explicit start operation, and the user has performed this operation at the terminal 400. The authorization token issuing processing is carried out following the flow defined in OAuth 2.0. Cases of Authorization Code Grant and Client Credentials Grant will be described in the present embodiment. A case of authorization token issuing processing according to Authorization Code Grant will be described later with reference to FIGS. 7 through 8C. A case of authorization token issuing processing according to Client Credentials Grant will be described later with reference to FIG. 9. In S1.11, the application module 800 acquires an authorization token by way of authorization token acquisition flow. In S1.12, the application module 800 makes a resource request to the resource server module 700 using the acquired authorization token. The resource server module 700 then receives the request and transmits a response via the HTTP server module 710 which is omitted from illustration in FIG. 6.

In S1.13, the resource server module 700 makes an authorization token verification request to the authorization server module 600. While description will be made here regarding the communication between the resource server module 700 and the authorization server module 600 being carried out over the LAN 101 in the present embodiment, a configuration may be made where this is carried out over the WAN 100. In this case, communication is carried out through the HTTP server modules 610 and 710. The authorization token verification processing performed when the authorization token verification request is accepted at the authorization server module 600 will be described later with reference to FIG. 10.

In S1.14, the resource server module 700 receives an authorization token verification response from the authorization server module 600. In the event that the verification result is valid, in S1.15 resource acquisition processing is performed. The acquired resource is then returned to the application module 800 in S1.16, and the processing ends. On the other hand, in a case where the authorization token verification response result is invalid, an error response is returned to the application module 800 n S1.17, and the processing ends, thus ending the flow of authorization token acquisition through resource acquisition using the authorization token at the application module 800.

Figure 8A:
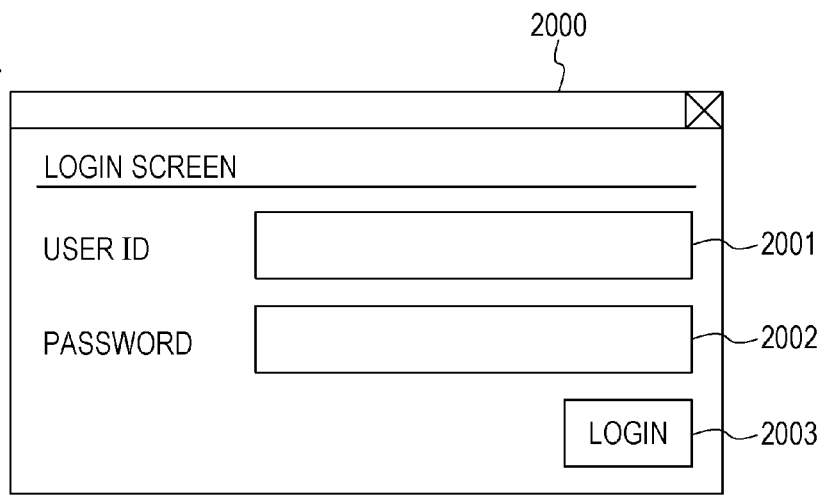
FIGS. 8A through 8C are examples of screens.
Figure 8B:
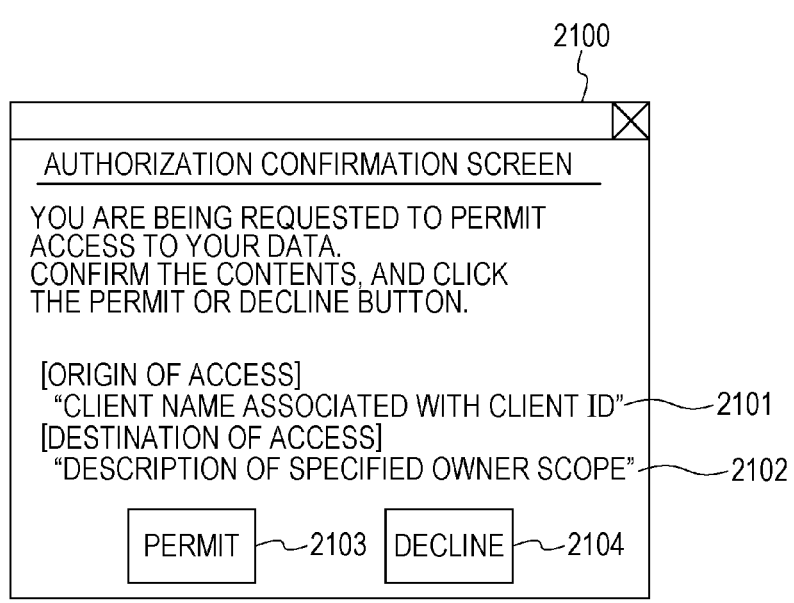
Figure 8C:
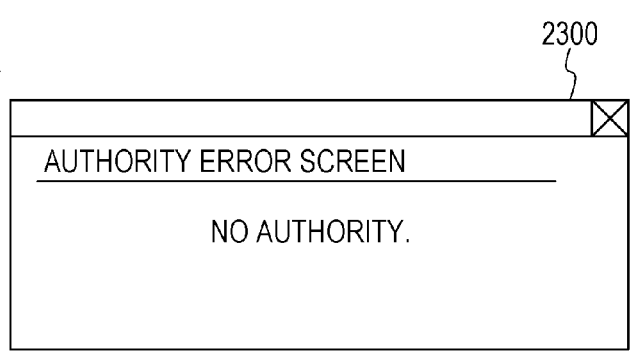

Next, authorization token issuing processing in a case of Authorization Code Grant in OAuth 2.0 will be described with reference to FIGS. 7 through 8C. In S2.1, the application module 800 makes an authorization request to the HTTP server module 610 via the Web browser 820. Note that settings are made at the HTTP server module 610 so that the endpoint accepting the authorization request is to request user authorization, not client authorization. An authorization request includes one or more scope IDs, including at least client ID acquired as the result of client registration, registered redirect URL, and at least one owner scope indicating the intended resource range. The resource intended for acquisition i.e., the authority which the application module 800 requests, differs depending on which function of the application module 800 the user has selected. For example, if the user has selected secure printing, this requires the security function and the printing function which the resource server provides, so the two authorities need to be requested accordingly.

In S2.2, the HTTP server module 610 accepts the authorization request. In S2.3, the HTTP server module 610 returns a login screen, which is an authentication screen, to the Web browser 820 so as to authenticate the user. FIG. 8A is an example of a login screen 2000 which the HTTP server module 610 returns. In the present embodiment, the user inputs the user ID and password, and authentication is made in a case where this set matches a set of information registered in the user management table 1700. Note that user authentication is not restricted to this arrangement, and other ways of user authentication may be used, such as an X.509 certificate, multi-step authentication where passwords are input multiple times, or the like. The login screen 2000 illustrated in FIG. 8A includes a user ID entry field 2001 to input a user ID, a password entry field 2002 to input a password, and a login button 2003 to execute the login operation.

In S2.4, the user inputs necessary information in the login screen 2000 illustrated in FIG. 8A which is displayed on the Web browser 820, and presses the login button 2003. In S2.5, the Web browser 820 transmits the input information to the HTTP server module 610. In S2.6, the HTTP server module 610 acquires the user ID and password, and verifies these by comparing with the information set of user ID 1701 and password 1702 in the user management table 1700, thus authenticating the user. In a case where the user authentication fails, i.e., in a case where the acquired information is not registered in the user management table 1700, the HTTP server module 610 returns an authentication error screen, omitted from illustration, to the Web browser 820. In a case where user authentication is successful, the HTTP server module 610 generates an authentication token. This authentication token is saved in nonvolatile memory of the HTTP server module 610, correlated with the user ID. In S2.7, the HTTP server module 610 notifies the authorization server module 600 of the authorization request received from the application module 800. This notification is made with the generated authentication token attached.

In S2.8 the authorization server module 600 verifies whether the set of client ID and redirect URL in the authorization request which it has received is correct. Specifically, the authorization server module 600 verifies whether the set of the client ID 1301 and the redirect URL 1307 registered in the client management table 1300 is correct. In the case of a non-match, the authorization server module 600 returns an error screen, omitted from illustration, to the Web browser 820 via the HTTP server module 610. If matching, the authorization server module 600 acquires user information in S2.9. More specifically, the authorization server module 600 acquires an associated user ID from the HTTP server module 610, using the authentication token notified thereto from the HTTP server module 610. The authority ID 1802 is then obtained from the user authority table 1800 based on this user ID. The number of authority IDs 1802 acquired here may be none, one, or multiple. While an example has been described in the present embodiment where user information acquisition is performed by the authorization server module 600 acquiring the user ID based on the authentication token and then obtaining user information, but user information acquisition is not restricted thusly. For example, an arrangement may be made where necessary user information is notified from the HTTP server module 610, or where necessary user information is acquired by handing the authentication token to the HTTP server module 610.

In S2.10, the authorization server module 600 acquires, of the scopes included in the authorization request, the authority ID 1604 for each owner scope from the scope table 1600 with the owner scope ID as a key. In S2.11 the authorization server module 600 verifies whether the authority ID 1604 for each owner scope that has been acquired is included in the authority ID 1802 acquired from the user authority table 1800. If there are multiple authority IDs 1604 associated to the owner scope ID in the scope table 1600, the verification is deemed to be valid if at least one of the multiple authority IDs 1604 is set to the user. Of course, an arrangement may be made where verification is deemed to be valid if all of the multiple authority IDs 1604 are set to the user. What is pertinent is that the requested authority is included in the authority defined beforehand. In a case where authority ID associated with the owner scope ID has not been set, a valid result is given regardless of user authority. In a case where an invalid result is given for one or more authority IDs of owner scopes included in the authorization request, in S2.28 the authorization server module 600 returns an authority error to the Web browser 820. In S2.29, the Web browser 820 returns the authority error to the application module 800. More specifically, the authorization server module 600 makes a redirect response to the Web browser 820 so as to redirect the Web browser 820 to the redirect URL acquired in the authorization request. In S2.30, the application module 800 returns an authority error screen 2300 exemplarily illustrated in FIG. 8C to the Web browser 820, and the flow ends.

In a case where a valid result is given for all owner scopes included in the authorization request, the authorization server module 600 returns an authorization confirmation screen 2100 to the Web browser 820 in S2.12. The authorization confirmation screen 2100 includes an access source display area 2101 which is an area to display the client name 1306 acquired from the client management table 1300, using the client ID included in the authorization request as a key. The authorization confirmation screen 2100 also includes a scope display area 2102 which is an area to display description 1603 of the scope obtained from the scope table 1600 with the owner scope ID included in the authorization request as a key. The authorization confirmation screen 2100 further includes a permit button 213 for the user to execute authorization operation of contents of the information listed above, and a decline button 2104 to decline execution. In a case where the user presses the decline button 2104, the authorization server module 600 returns an authority error to the application module 800 in S2.28, in the same way as a case where the result of owner authority verification is invalid. Note that such authority error response may be of a configuration of a screen to display on the application module 800 receiving the response, or of a configuration where the contents of the error response can be selected, to change the expression.

In a case where the user has pressed the permit button 2103 on the authorization confirmation screen 2100 in S2.13, i.e., has performed an authorization operation, the authorization server module 600 is notified in S2.14 via the Web browser 820 that permission has been granted. In S2.15 the authorization server module 600 issues an authorization code. More specifically, the authorization server module 600 issues an authorization token ID, and registers the scope ID and client ID included in the authorization request, and the user ID of the user which has been authenticated and which has granted permit, as the owner ID, in the authorization token management table 1900. The token type 1902 at this time is authorization code, and the date and time when this authorization code will cease to be valid is registered in the expiration date 1903. In S2.16 and S2.17 the authorization server module 600 returns an authorization to the application module 800 via the Web browser 820, with the authorization token ID of the issued authorization code attached thereto. More specifically, the authorization server module 600 makes a redirect response to the Web browser 820 so as to redirect the Web browser 820 to the redirect URL acquired in the authorization request.

In S2.18, the application module 800 requests the authorization server module 600 for an authorization token. This authorization token request includes at least the acquired authorization code, client ID, secret, and redirect URL transmitted at the time of transmitting the authorization request.

In S2.19 the authorization server module 600 authenticates the client by the set of client ID and secret that has been obtained. More specifically, the authorization server module 600 authenticates the client by verifying whether or not the obtained set of client ID and secret match the set of client ID 1301 and secret 1302 in the client management table 1300. In a case where the client authentication fails, the authorization server module 600 returns an authentication error response to the application module 800. If the client authentication is successful, in S2.20 the authorization server module 600 verifies the obtained authorization code.

The authorization code verification involves whether the authorization token ID of the acquired authorization code is registered in the authorization token management table 1900, and if registered, whether within the range of the expiration date. Further, the authorization server module 600 verifies whether the redirect URL acquired in the authorization token request matches the redirect URL 1307 registered in the client management table 1300 with the client ID 1905 associated with the authorization token ID as a key. In a case where the result of authorization code verification is invalid, the authorization server module 600 returns a token invalid error reply to the application module 800. In a case where the result of authorization code verification is valid, in S2.21 the authorization server module 600 acquires client information. More specifically, the authorization server module 600 acquires the authority ID 1502 from the client authority table 1500 with the authenticated client ID as a key. At this time, the number of acquired authority IDs 1502 may be none, one or multiple.

In S2.22, the authorization server module 600 acquires the scope ID 1904 from the authorization token management table 1900, with the acquired authorization token ID of the authorization code as a key. Next, the authorization server module 600 acquires the authority ID 1604 of each client scope from the scope table 1600, with the client scope ID of the acquired scopes as a key. At this time, if no client scope is included in the scope ID acquired from the authorization token management table 1900, the client authority verification result is valid.

In S2.23, the authorization server module 600 verifies whether the authority ID 1604 for each acquired client scope is included in the authority ID 1502 acquired from the client authority table 1500. In a case where there are multiple authority ID, 1604 associated with the client scope ID in the scope table 1600, if at least one authority ID of the multiple authority IDs 1604 is set to the client, the result is deemed to be valid. In a case where authority ID associated with the client scope ID has not been set, a valid result is given regardless of client authority. In a case where an invalid result is given for one or more authority IDs of client scopes associated with the authorization code, in S2.26 the authorization server module 600 returns an authority error to the application module 800. In S2.27, the application module 800 returns the authority error screen 2300 illustrated in FIG. 8C to the Web browser 820, and the processing ends.

In a case where a valid result is given for all client scopes associated to the authorization code, in S2.24 the authorization server module 600 issues an authorization token. More specifically, the authorization server module 600 issues an authorization token ID, and registers the scope ID associated to the authorization code, owner ID, and authenticated client ID, in the authorization token management table 1900. At this time, the token type 1902 is set to authorization token, and the date and time at which the authorization token expires is registered in the expiration date 1903. In S2.24 the authorization server module 600 returns the authorization token ID of the authorization token that has been issued to the application module 800, and the processing ends. An arrangement may be made where the expiration date of the authorization token is returned as well. An example of not issuing a refresh token to update the authorization token has been described in the present embodiment, but an arrangement may be made where the ID and expiration date of refresh tokens are managed at the authorization token management table 1900. At this time, a configuration may be made where a refresh token is issue at the same time as issuing the authorization token, and returning the ID of the issued refresh token when returning the authorization token.

Description will now be made regarding authorization token issuing processing in the case of Client Credentials Grant in OAuth 2.0, with reference to FIG. 9. In S3.1 the application module 800 requests the authorization server module 600 for an authorization token. This authorization token request includes at least client ID, secret, and at least one owner scope indicating resource range intended for acquisition or range of service to be used.

In S3.2, the authorization server module 600 authenticates the client using the set of client ID and secret that has been acquired. More specifically, the authorization server module 600 performs this authentication by verifying whether the set of client ID and secret match the set of client ID 1301 and secret 1302 in the client management table 1300. In a case of failing client authentication here, the authorization server module 600 returns an authentication error to the application module 800. If client authentication is successful, in S3.3 the authorization server module 600 acquires client information. More specifically, the authorization server module 600 acquires the authority ID 1502 from the client authority table 1500 with the authenticated client ID as a key. The number of authority IDs 1502 may be none, one, or multiple.

In S3.4, the authorization server module 600 acquires, of the scopes included in the authorization token request, the authority ID 1604 for each owner scope from the scope table 1600 with the owner scope ID as a key. In S3.5 the authorization server module 600 verifies whether the authority ID 1604 for each owner scope that has been acquired is included in the authority ID 1502 acquired from the client authority table 1500. At this time, if there are multiple authority IDs 1604 associated with the owner scope ID in the scope table 1600, the result is deemed to be valid if at least one authority ID of the multiple authority IDs 1604 is set to the client. If no authority ID associated to the owner scope ID is set, the result is deemed to be valid regardless of client authority.

In a case where the result is valid for all owner scopes included in the authorization token request, the flow advances to S3.6. In S3.6, the authorization server module 600 acquires the authority ID 1604 of each client scope from the scope table 1600, with the client scope ID of the scopes included in the authorization token request as a key. At this time, if no client scope is included in the scope IDs in the authorization token request, the result of client authority verification is valid. The authorization server module 600 then verifies in S3.7 whether the acquired authority ID 1604 for each client scope is included in the authority ID 1502 acquired from the client authority table 1500. At this time, if there are multiple authority IDs 1604 associated with the client scope ID in the scope table 1600, the result is deemed to be valid if at least one authority ID of the multiple authority IDs 1604 is set to the client. If no authority ID associated to the client scope ID is set, the result is deemed to be valid regardless of client authority.

In a case where, the result of this verification is invalid for one or more authority IDs of the owner scopes and client scopes included in the authorization token request, the flow advances to S3.10. In S3.10, the authorization server module 600 returns an authority error reply to the application module 800 and the processing ends. In a case where the result is valid for all owner scopes and client scopes included in the authorization token request, in S3.8 the authorization server module 600 issues an authorization token. More specifically, the authorization server module 600 issues an authorization token ID, and registers the scope ID included in the authorization request, the client ID of the client which has been authenticated, and the client ID as the owner ID, in the authorization token management table 1900. The token type 1902 at this time is authorization token, and the date and time when this authorization code will cease to be valid is registered in the expiration date 1903. In S3.9 the authorization server module 600 returns the authorization token ID of the issued authorization token to the application module 800, and ends the processing. A configuration may also be made where the expiration date of the authorization token is returned at this time as well.

Figure 10:
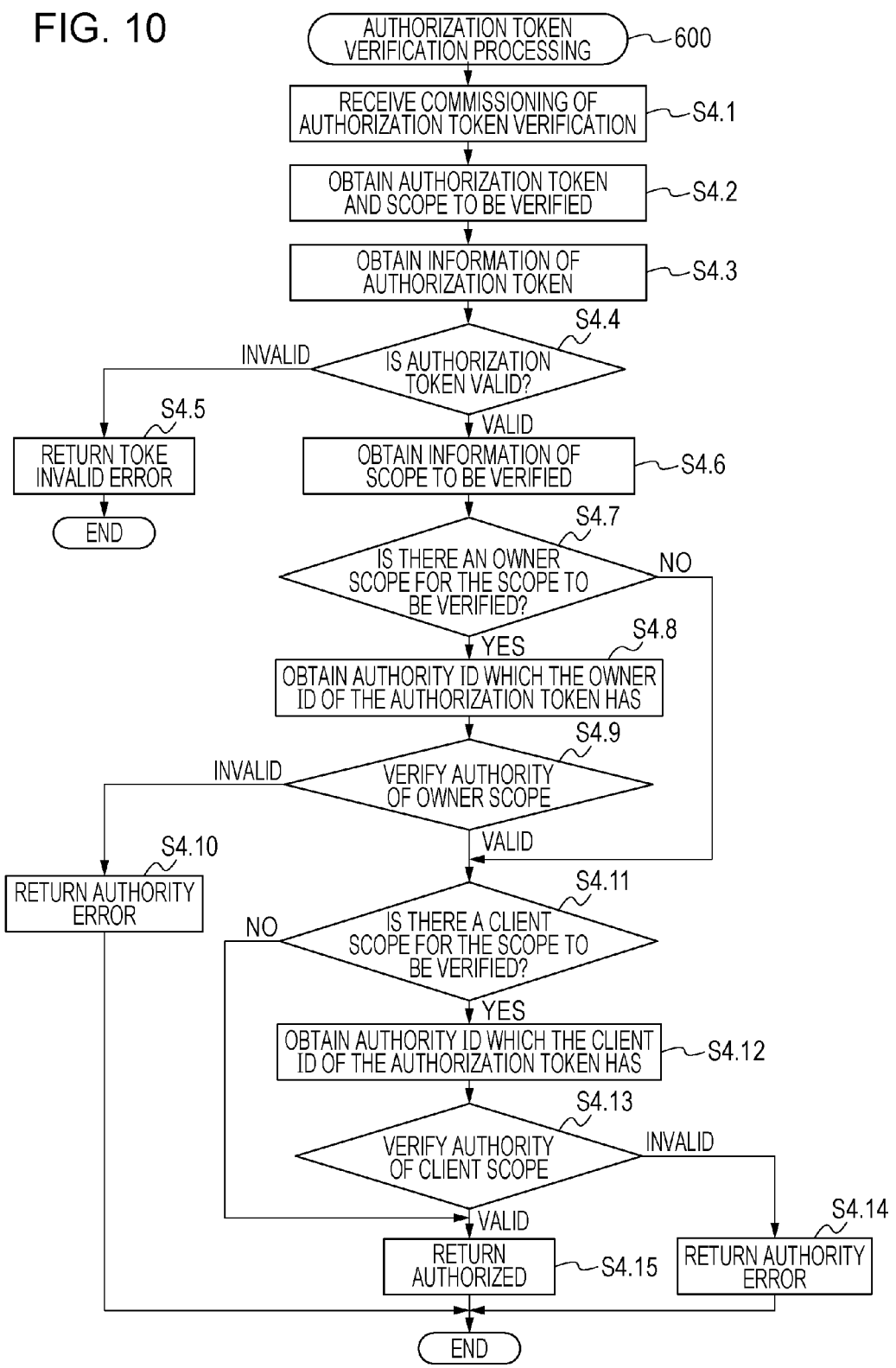
FIG. 10 is an authorization token verification process flow.

Next, authorization token verification processing will be described with reference to FIG. 10. FIG. 10 is a flowchart illustrating the authorization token verification processing executed at the authorization server module 600. In S4.1, the authorization server module 600 is commissioned by the resource server module 700 to verify an authorization token.

This authorization token verification commissioning includes the authorization token ID of the authorization token to be verified, and one or more scope IDs. In S4.2, the authorization server module 600 acquires the authorization token ID and scope ID. Next, in S4.3 the authorization server module 600 acquires information of the authorization token based on the acquired authorization token ID. More specifically, the authorization server module 600 acquires the expiration date 1903 from the authorization token management table 1900 with the authorization token ID and "token type: authorization token" as a key. In S4.4, the authorization server module 600 verifies whether or not the authorization token exists in the authorization token management table 1900, and whether or not the authorization token is yet unexpired. If the verification result is that the authorization token does not exist, or does exist but has expired, the authorization token is determined to be invalid, so in S4.5 the authorization server module 600 returns a token invalid error, and ends the processing. If the verification finds that the authorization token exists and is still valid, the processing continues.

In S4.6 the authorization server module 600 obtains scope information included in the verification commission. More specifically, the authorization server module 600 acquires the type 1602 and authority ID 1604 of each scope in the scope table 1600 with the scope ID as the key. In S4.7, whether one or more owner scope is included in the type 1602 of the one or multiple scopes acquired, is confirmed. If none, the flow advances to S4.11. If there is one or more included, in S4.8 the authorization server module 600 acquires owner information. More specifically, the authorization server module 600 acquires owner ID 1908 from the authorization token management table 1900 with the authorization token ID as a key. The authorization server module 600 then acquires the authority ID 1502 and authority ID 1802 from the client authority table 1500 and user authority table 1800 respectively, with the acquired owner ID as a key. The number of authority IDs 1502 acquired here may be none, one, or multiple.

Next, in S4.9 the authorization server module 600 performs authority verification of the owner scope acquired in S4.6. More specifically, the authorization server module 600 acquires the authority ID 1604 of each owner scope from the scope table 1600 with the owner scope ID acquired in S4.6 as a key. The authorization server module 600 then verifies each authority ID 1604 of each owner scope that has been acquired regarding whether included in the authority ID 1502 acquired in S4.8, or the authority ID 1802. At this time, if there are multiple authority IDs 1604 associated with the owner scope ID in the scope table 1600, the result is deemed to be valid if at least one authority ID of the multiple authority IDs 1604 is set to the owner. If no authority ID associated to the owner scope ID is set, the result is deemed to be valid regardless of client authority. In a case where the result of verification is invalid for one or more authority ID, in S4.10 the authorization server module 600 returns an authority error response to the resource server module 700 and ends the processing. In a case where the verification result is that all owner scopes acquired in S4.6 are valid, the flow advances to S4.11.

In S4.11, the authorization server module 600 confirms whether the one or multiple scope types 1602 acquired in S4.6 include at least one client scope. If none, the flow advances to S4.15. If there is one or more included, in S4.12 the authorization server module 600 acquires client information. More specifically, the authorization server module 600 acquires client ID 1907 from the authorization token management table 1900 with the authorization token ID as a key, and acquires the authority ID 1502 from the client authority table 1500 with the acquired client ID as a key. The number of authority IDs 1502 acquired here may be none, one, or multiple.

Next, in S4.13, the authorization server module 600 authority verification of the client scope acquired in S4.6. More specifically, the authorization server module 600 acquires the authority ID 1604 of each client scope from the scope table 1600 with the client scope ID acquired in S4.6 as a key. The authorization server module 600 then verifies each authority ID 1604 of each client scope that has been acquired regarding whether included in the authority ID 1502 acquired in S4.12. At this time, if there are multiple authority IDs 1604 associated with the client scope ID in the scope table 1600, the result is deemed to be valid if at least one authority ID of the multiple authority IDs 1604 is set to the client. If no authority ID associated to the owner scope ID is set, the result is deemed to be valid regardless of client authority. In a case where the result of verification is invalid for one or more authority ID, in S4.14 the authorization server module 600 returns an authority error response to the resource server module 700 and ends the processing.

In a case where the result of verification is valid for all client scopes obtained in S4.6, the flow advances to S4.15. In S4.15 the authorization server module 600 returns to the resource server module 700 that the authority is valid as a result of the authorization token validation processing, and ends the processing. This sequence enables the resource server module 700 to validate only accesses with proper authority from the application module 800 to be validated, and prevent accesses from unintended application modules 800 to be handled as authority errors.

According to the present embodiment, authority granted to an application module 800 registered online can be granted while identifying the application module 800. Thus, usage of the resource server module 700 from an unintended application module 800 can be prevented. For example, with regard to a pay service of a resource server module 700, a certificate enabling the pay services is assembled in the application module 800 (pay application) which can use the pay service beforehand, so only such application modules 800 can use the resource server module 700.

Second Embodiment

Figure 6:
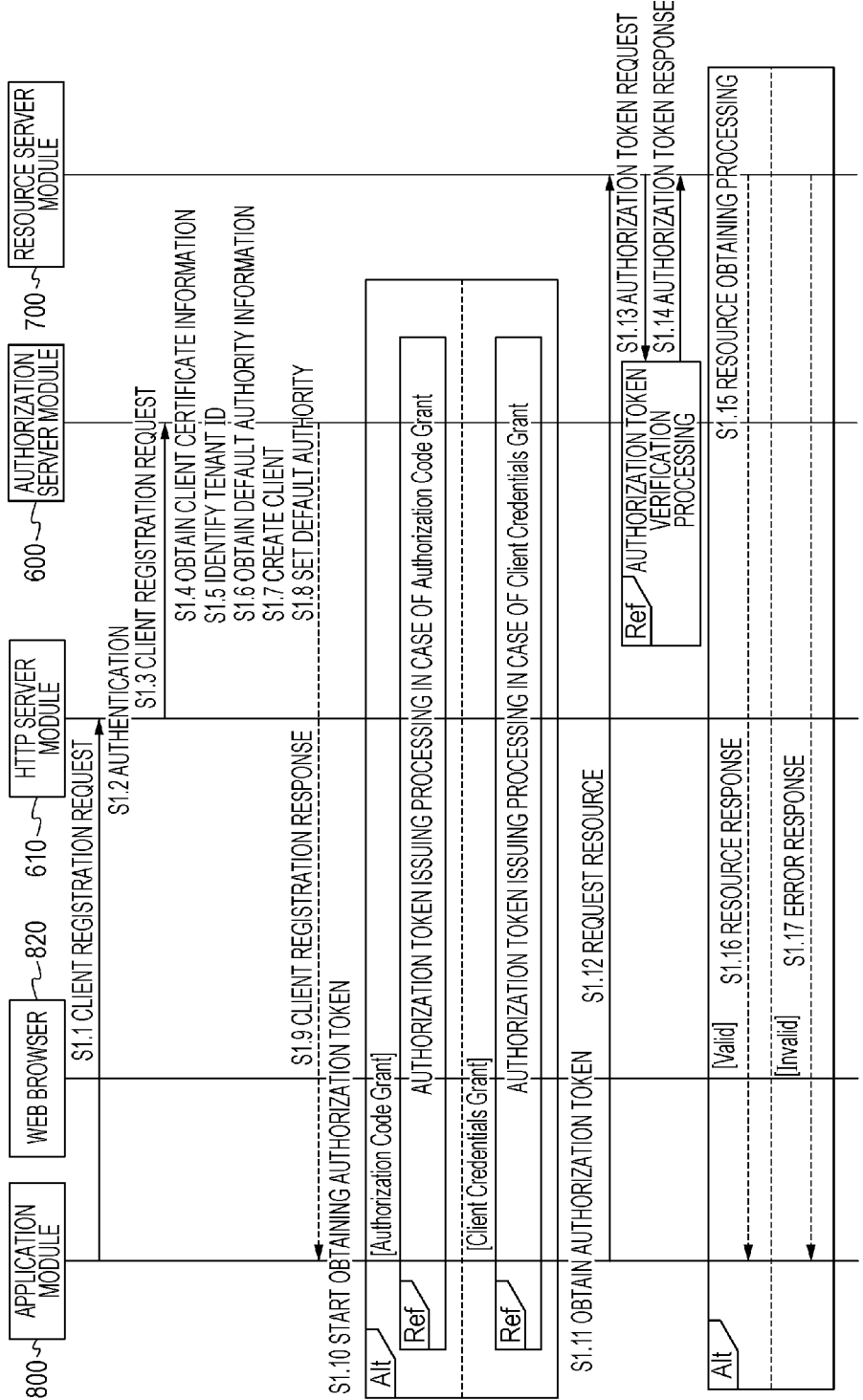
FIG. 6 illustrates a sequence from client registration to resource access.

The client registration sequence described in FIG. 6 involved the authorization server module 600 side deciding the authority ID set to the client. However, this processing flow may result in a situation where client registration is successful, but thereafter authority errors occur at the time of making an authorization token issue request. In this case, the client registration process is useless. On the other hand, the client knows the client scope ID specified for an authorization request or authorization token issue request. Accordingly, an arrangement may be made where the client scope to be used is requested at the time of client registration, and if authority is insufficient, a registration error is returned at that point. Thus, useless client registration can be avoided.

A second embodiment which deals with this will be described with reference to FIGS. 11 and 12. Note that the second embodiment is no different from the first embodiment except for the client registration sequence in FIG. 6, so description of the same portions will be omitted. Steps which are the same as those in FIG. 6 will also be denoted by the same numerals and description will be omitted.

FIG. 11 illustrates the client registration sequence according to the second embodiment. In S5.1, the application module 800 of the terminal 400 makes a client registration request to the HTTP server module 610 of the authorization server 200. Note that the trigger for the client registration request of the application module 800 is the timing at which the user first installs the application module 800 in the terminal 400 and starts it up. Other conceivable triggers include the timing of the user selecting a function of the application module 800, causing a resource request to the resource server 300. Another is where the application module 800 has an explicit start operation, and the user has performed this operation at the terminal 400. Note that a client registration request includes the client name, a redirect URL to use Authorization Code Grant, and client scope ID to specify at the time of an authorization request or authorization token request. Other information which may be included are a text string to describe the client, a URL of a site which is described, and other like attached information.

Next, description of the client authentication processing S1.2 at the HTTP server module 610 upon having accepted the client registration request from the application module 800 will be omitted. In S5.2, after having authenticated the application module 800, the HTTP server module 610 notifies the authorization server module 600 of the client registration request received from the application module 800. At this time, the HTTP server module 610 also notifies the authorization server module 600 of information to identify the authenticated application module 800. More specifically, the HTTP server module 610 notifies the authorization server module 600 of information of the acquired certificate. After S1.4, S1.5, and S1.6, the authorization server module 600 acquires the default authority ID 1402. Details are as described earlier.

Next, in S5.3 the authorization server module 600 starts registration authority verification. This registration authority verification will be described with reference to FIG. 12. FIG. 12 is a flow of the registration authority verification processing at the authorization server module 600. In S6.1, the authorization server module 600 accepts a registration authority verification commission. Next, in S6.2, the authorization server module 600 acquires client scope information regarding which the client registration request has been received. More specifically, the authorization server module 600 acquires the authority ID 1604 from the scope table 1600 with the specified scope ID and "scope type: client scope" as a key. In a case where no client scope is included in the specified scope ID in S6.3, the flow advances to S6.4, the default authority ID acquired in S1.6 due to the verification result being valid is returned, and the process ends. In a case where a client scope is included in the specified scope ID, the flow advances to S6.5.

In S6.5 the authorization server module 600 verifies whether the authority ID 1604 of the acquired client scope is included in the default authority ID acquired in S1.6. If one or more authority IDs 1604 is not included in the default authority ID, an authority error is returned in S6.6 and the processing ends. In a case where all authority IDs 1604 acquired in S6.2 are included in the default authority ID, in S6.7 the authorization server module 600 returns all authority IDs 1604 acquired in S6.2 since the verification result is valid, and the processing ends.

Returning to FIG. 11, in S5.4 the authorization server module 600 acquires the results of the registration authority verification processing having ended. If the result is invalid, in S5.6 a client registration error response is returned to the application module 800. In a case where the registration authority verification result is valid, in S1.7 the authorization server module 600 newly registers the client. Details of the processing are as described earlier. Next, in S5.5 the authorization server module 600 issues a client ID and secret, and stores the registered client ID and authority ID obtained as the result of the registration authority verification in the client authority table 1500. In a case where multiple authority IDs have been acquired, multiple records will be stored. After this registration has been completed, in S1.9 the authorization server module 600 returns the issued client ID and secret to the application module 800 via the HTTP server module 610. This ends description of the client registration according to the second embodiment.

According to the above-described processing, the authorization server module 600 accepts a request for a scope to be used at the time of client registration, and if the authority thereof is insufficient, and perform processing to return a registration error at that point. Thus, useless client registration can be avoided.

Other Embodiments

The embodiments of the present invention have been described by way of examples of pay services, free services, pay applications, and free applications. However, services and applications are not necessarily restricted to these. Any sort of services and applications may be used, as long an application registration protocol can be restricted in authority delegate processing so that a particular application does not unnecessarily access a particular service.

Also, the embodiments of the present invention have been described with regard to a method of authority delegate in processing between an application in a terminal and a service on the Internet. However, this is not restricted to applications in terminals, and may also be applied to server-type services connected over the Internet. Accordingly, in the present embodiment, subject of the source of coordination is called "service".

The present invention is realized by executing the following processing. Software (program) realizing the functions of the above-described embodiments is supplied to a system or device via network or various types of storage media, and a computer (or CPU or MPU) of the system or device reads and executes the program.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-130857, filed Jun. 21, 2013, which is hereby incorporated by reference herein in its entirety.

What is claimed is:

1. An authority delegate system, including a provider server system which provides a service to a device having an application, and an authorization server system which performs authorization processing to delegate user authority in the service to a usage source of the service, the authority delegate system comprising:
at least one processor coupled to a memory;
a management unit of the authorization server system configured to receive a request from the device to register the application as the usage source of the service, to identify authority of the application in accordance with the received request, and to manage, in an associated manner, an identifier of the application and the identified authority; and
a providing unit of the provider server system configured to provide the service in a case where
(i) an authorization operation has been performed to permit delegating the user authority to the application that will be transmitting a request to use the service, and
(ii) the management unit issues an authorization code to the application in response to permitting delegating the user authority to the application, and
(iii) the issued authorization code is received by the providing unit from the application, wherein a scope identification (ID) is acquired based on the authorization code, and
(iv) a range authorization ID, identified by the acquired scope ID, is included in range authorization IDs set in the application,
wherein the management unit and the providing unit are implemented by the at least one processor.

2. The authority delegate system according to claim 1, wherein the management unit receives authentication information of the application along with the request to register the application as the usage source, and identifies the authority of the application based on the received authentication information.

3. The authority delegate system according to claim 1, wherein an authentication screen is provided to input authentication information of the user, and the authority of the user is identified based on the authentication information input by way of the authentication screen, and
wherein the providing unit provides the service in a further case where the authority which the application uses is included within the identified authority of the user.

4. The authority delegate system according to claim 3, wherein, in a case where the authorization operation to permit delegating the user authority to the application transmitting a request to use the service has not been performed, an error response is transmitted, wherein, in a case where an authority which the application uses is not included in authorities associated with the identifier of the application, an error response is transmitted, or
wherein, in a case where the authority which the application uses is not included within the identified authority of the user, an error response is transmitted.

5. The authority delegate system according to claim 1,
wherein the management unit receives information of the authority which the application uses and authentication information of the application along with the request to register the application as the usage source,
wherein, in a case where the authority that the application uses is included within the authority of the application identified based on the authentication information of the application, the management unit manages the identified authority and the identifier of the application in an associated manner, and
wherein, in a case where the authority that the application uses is not included within the authority of the application identified based on the authentication information of the application, the management unit does not register the application but instead transmits an error response.

6. The authority delegate system according to claim 1, wherein the identified authority of the application differs depending on a certificate that the application transmits.

7. The authority delegate system according to claim 1, wherein, in response to a user installing and then starting the application in the device, the management unit receives the request from the device to register the application as the usage source of the service.

8. The authority delegate system according to claim 1, wherein, authority associated with the authentication information which the application transmits, is granted by the management unit of the authorization server system to the application module.

9. The authority delegate system according to claim 8, wherein the management unit obtains a tenant master distinguished name (DN) based on the authentication information and uses the tenant master DN to obtain a tenant identification (ID), wherein the management unit uses the tenant ID to obtain the authority associated with the authentication information.

10. The authority delegate system according to claim 1, wherein the device is at least one of a smartphone, a portable terminal, and an image formation apparatus.

11. The authority delegate system according to claim 1, wherein the authorization server system is configured to be in communication with a database server and the authorization server, the provider server system, and database server are configured on the same server.

12. A control method to control an authority delegate system, including a provider server system which provides a service to a device having an application, and an authorization server system which performs authorization processing to delegate user authority in the service to a usage source of the service, the control method comprising:
in a management unit of the authorization server system, receiving a request from the device to register the application as the usage source of the service, identifying authority of the application in accordance with the received request, and managing, in an associated manner, an identifier of the application and the identified authority; and
providing, via a providing unit of the provider server system, the service in a case where (i) an authorization operation has been performed to permit delegating the user authority to the application that will be transmitting a request to use the service, and
(ii) the management unit issues an authorization code to the application in response to permitting delegating the user authority to the application, and
(iii) the issued authorization code is received by the providing unit from the application, wherein a scope identification (ID) is acquired based on the authorization code, and
(iv) a range authorization ID, identified by the acquired scope ID, is included in range authorization IDs set in the application.

13. A non-transitory computer-readable storage medium storing a program to cause an authority delegate system to perform a control method, wherein the authority delegate system includes a provider server system which provides a service to a device having an application, and an authorization server system which performs authorization processing to delegate user authority in the service to a usage source of the service, the control method comprising:

in a management unit of the authorization server system, receiving a request from the device to register the application as the usage source of the service, identifying authority of the application in accordance with the received request, and managing, in an associated manner, an identifier of the application and the identified authority; and providing, via a providing unit of the provider server system, the service in a case where (i) an authorization operation has been performed to permit delegating the user authority to the application that will be transmitting a request to use the service, and
(ii) the management unit issues an authorization code to the application in response to permitting delegating the user authority to the application, and
(iii) the issued authorization code is received by the providing unit from the application, wherein a scope identification (ID) is acquired based on the authorization code, and
(iv) a range authorization ID, identified by the acquired scope ID, is included in range authorization IDs set in the application.

* * * * *